United States Patent
Lee et al.

(10) Patent No.: US 9,491,367 B2
(45) Date of Patent: Nov. 8, 2016

(54) IMAGE DATA PROCESSING METHOD AND ELECTRONIC DEVICE SUPPORTING THE SAME

(71) Applicant: Samsung Electronics Co., Ltd., Gyeonggi-do (KR)

(72) Inventors: Wooyong Lee, Gyeonggi-do (KR); Hyeonjae Bak, Gyeonggi-do (KR); Jaeyun Song, Seoul (KR); Sangheum Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/202,334

(22) Filed: Mar. 10, 2014

(65) Prior Publication Data

US 2014/0267842 A1    Sep. 18, 2014

(30) Foreign Application Priority Data

Mar. 14, 2013    (KR) .......................... 10-2013-0027602

(51) Int. Cl.
*H04N 5/228*    (2006.01)
*H04N 5/232*    (2006.01)
(Continued)

(52) U.S. Cl.
CPC ............ *H04N 5/23293* (2013.01); *G06F 3/14* (2013.01); *G09G 5/363* (2013.01); *H04N 5/23229* (2013.01); *H04N 5/23241* (2013.01); *G09G 2330/021* (2013.01); *G09G 2340/02* (2013.01); *G09G 2340/125* (2013.01); *G09G 2360/08* (2013.01); *G09G 2360/10* (2013.01); *G09G 2360/144* (2013.01); *H04N 5/2258* (2013.01); *H04N 5/23245* (2013.01)

(58) Field of Classification Search
CPC ..................... H04N 5/23229; H04N 5/23293; H04N 5/23241; H04N 5/23245; H04N 5/2258; G06F 3/14; G19G 5/363; G09G 2330/021; G09G 2340/02; G09G 2340/125; G09G 2360/08; G09G 2360/10; G09G 2360/144
USPC ............................................... 348/222.1, 262
See application file for complete search history.

(56) References Cited

U.S. PATENT DOCUMENTS 7,583,316 B2 *    9/2009    Miyashita ............ H04N 5/2252
                                              348/333.05
7,991,285 B2 *    8/2011    Tan ................................ 396/322
(Continued)

FOREIGN PATENT DOCUMENTS

EP              1 422 659 A1    5/2004
KR     10-2008-0063996 A        7/2008
(Continued)

*Primary Examiner* — Sinh Tran
*Assistant Examiner* — Zhenzhen Wu
(74) *Attorney, Agent, or Firm* — Cha & Reiter, LLC (57) ABSTRACT

An electronic device processes image data using a plurality of image sensors and a control unit. The control unit, in response to receiving image data from one image sensor of the plurality of image sensors, establishes a single mode processing path for processing the received image data using a first processor corresponding to system processing unit via the single mode processing path. The control unit, in response to receiving the image data from two or more sensors of the plurality of image sensors, establishes a dual mode processing path for processing the image data using a second processor corresponding to a graphic processing unit, and processing the image data via the dual mode processing path.

19 Claims, 6 Drawing Sheets

(51) Int. Cl.
*G06F 3/14* (2006.01)
*G09G 5/36* (2006.01)
*H04N 5/225* (2006.01)

(56) References Cited

U.S. PATENT DOCUMENTS

| | | | |
|---|---|---|---|
| 8,520,080 B2* | 8/2013 | Havens ................ | H04N 5/2258 235/440 |
| 8,953,079 B2* | 2/2015 | Raju et al. ............... | 348/333.01 |
| 2004/0119718 A1 | 6/2004 | Kayada | |
| 2008/0309774 A1* | 12/2008 | Beng Goh ......... | H04N 13/0003 348/218.1 |
| 2009/0315899 A1 | 12/2009 | Pourbigharaz et al. | |
| 2010/0053212 A1 | 3/2010 | Kang et al. | |
| 2011/0058053 A1 | 3/2011 | Roh | |
| 2011/0164105 A1* | 7/2011 | Lee ....................... | H04N 7/142 348/14.02 |
| 2011/0187811 A1* | 8/2011 | Kim ..................... | H04N 5/225 348/14.01 |
| 2011/0249073 A1 | 10/2011 | Cranfill et al. | |
| 2011/0267510 A1* | 11/2011 | Malone ............. | H01L 27/14625 348/262 |
| 2011/0310107 A1* | 12/2011 | Shiraki ................... | G06T 1/20 345/502 |
| 2012/0008011 A1 | 1/2012 | Garcia Manchado | |
| 2012/0044372 A1* | 2/2012 | Cote et al. ................ | 348/218.1 |
| 2012/0092351 A1 | 4/2012 | Barnes | |
| 2012/0120186 A1* | 5/2012 | Diaz et al. ..................... | 348/36 |
| 2012/0268552 A1 | 10/2012 | Choi et al. | |
| 2012/0274808 A1 | 11/2012 | Chong et al. | |
| 2012/0313952 A1 | 12/2012 | Nakayama et al. | |
| 2013/0235224 A1* | 9/2013 | Park et al. ................ | 348/218.1 |
| 2014/0189708 A1 | 7/2014 | Lee et al. | |
| 2014/0240454 A1* | 8/2014 | Hirata et al. ..................... | 348/38 |

FOREIGN PATENT DOCUMENTS

KR 10-2012-0091550 A 8/2012
KR 10-2013-0019674 A 2/2013

* cited by examiner

IMAGE DATA PROCESSING METHOD AND ELECTRONIC DEVICE SUPPORTING THE SAME

CLAIM OF PRIORITY

This application claims the benefit under 35 U.S.C. §119 (a) of a Korean patent application filed on Mar. 14, 2013 in the Korean intellectual property office and assigned serial No. 10-2013-0027602, the entire disclosure of which is hereby incorporated by reference.

BACKGROUND

1. Technical Field

A system concerns processing image data collected by at least one image sensor.

2. Description of the Related Art

Electronic devices are continuously decreasing in size and expanding in capabilities so as to be applicable to many fields as well as everyday life. Known portable devices integrate different functions. Further, image collection function-equipped portable electronic devices are typically provided with an image sensor module.

SUMMARY

A system provides an improved user interface and reduces power consumption in processing video data. An electronic device processes image data and comprises a plurality of image sensors and a control unit. The control unit is configured to, in response to receiving image data from one image sensor of the plurality of image sensors, establish a single mode processing path for processing the received image data using a first processor corresponding to system processing unit via the single mode processing path. In response to receiving the image data from two or more sensors of the plurality of image sensors, the control unit establishes a dual mode processing path for processing the image data using a second processor corresponding to a graphic processing unit, and to process the image data via the dual mode processing path.

In a feature, the plurality of image sensors comprise a first image sensor of a front camera of the electronic device and a second image sensor of a rear camera of the electronic device and the first image sensor acquires an image with a high resolution relative to an image acquired by the second image sensor. The control unit compensates for low resolution of acquired image data in response to data indicating screen resolution of a preview image. The control unit comprises, a camera driver receiving image data provided by one sensor and at least one of, a composer which merges the received image data provided by the camera driver with a predetermined screen data component, a media recorder for recording video based on the image data received by the camera driver, a capture buffer for buffering captured data derived based on the image data, and a Joint Photographic Expert Group (JPEG) encoder. Further, the control unit allocates a plurality of buffers for buffering texture data for use with received image data. A common buffer buffers the image data obtained by merging wherein the common buffer stores preview data and video data and a buffer buffers image effect data to be applied in merging with the image data.

In another feature, the control unit initiates, switching from a single mode using one image sensor to a dual mode for processing image data from the plurality of image sensors, buffering texture data for use with the image data acquired using the plurality of image sensors and outputting or storing merged image data derived using the texture data. The control unit also initiates switching between the dual mode and the single mode, to maintain the texture and perform gradual presentation processing.

In yet another feature, an image data processing method comprises, in response to receiving image data from one image sensor of a plurality of image sensors, establishing a single mode processing path for processing the received image data using a first processor corresponding to a system processing unit and processing the received image data using the first processor using the single mode processing path. In response to receiving the image data from two or more sensors of the plurality of image sensors, the method establishes a dual mode processing path for processing the image data using a second processor corresponding to a graphic processing unit and processing the image data through the dual mode path.

In an additional feature, the method receives image data provided by one sensor and at least one of, merges the image data provided by the camera driver with a predefined screen component, records video based on the image data provided by a camera driver and buffers data derived based on the image data. The method also buffers texture data corresponding to the image data in response to detection of a request for switching from the single mode to the dual mode and outputs or stores merged image and texture data and maintains the texture and performs gradual presentation processing in response to switching between the dual mode and the single mode.

DETAILED DESCRIPTION

Exemplary embodiments of the system are described with reference to the accompanying drawings. Detailed description of well-known functions and structures incorporated herein may be omitted to avoid obscuring the subject matter and omit superfluous description. In the drawings, certain elements may be exaggerated or omitted or schematically depicted for clarity of the disclosure, and the actual sizes of the elements are not reflected. Thus, the present disclosure is not limited in the relative sizes of the elements and distances therebetween. The term "graphic data" as used herein comprises data that has an associated coding representation that determines how to interpret a specific pattern of bits. A "graphics Processing Unit" comprises a computer or logic chip or portion of a chip that performs rapid mathematical calculations, primarily for the purpose of rendering images, animations or video for a computer screen display, for example, that takes on graphical calculations and transformations and may reduce burden on a CPU, for example.

Figure 1:
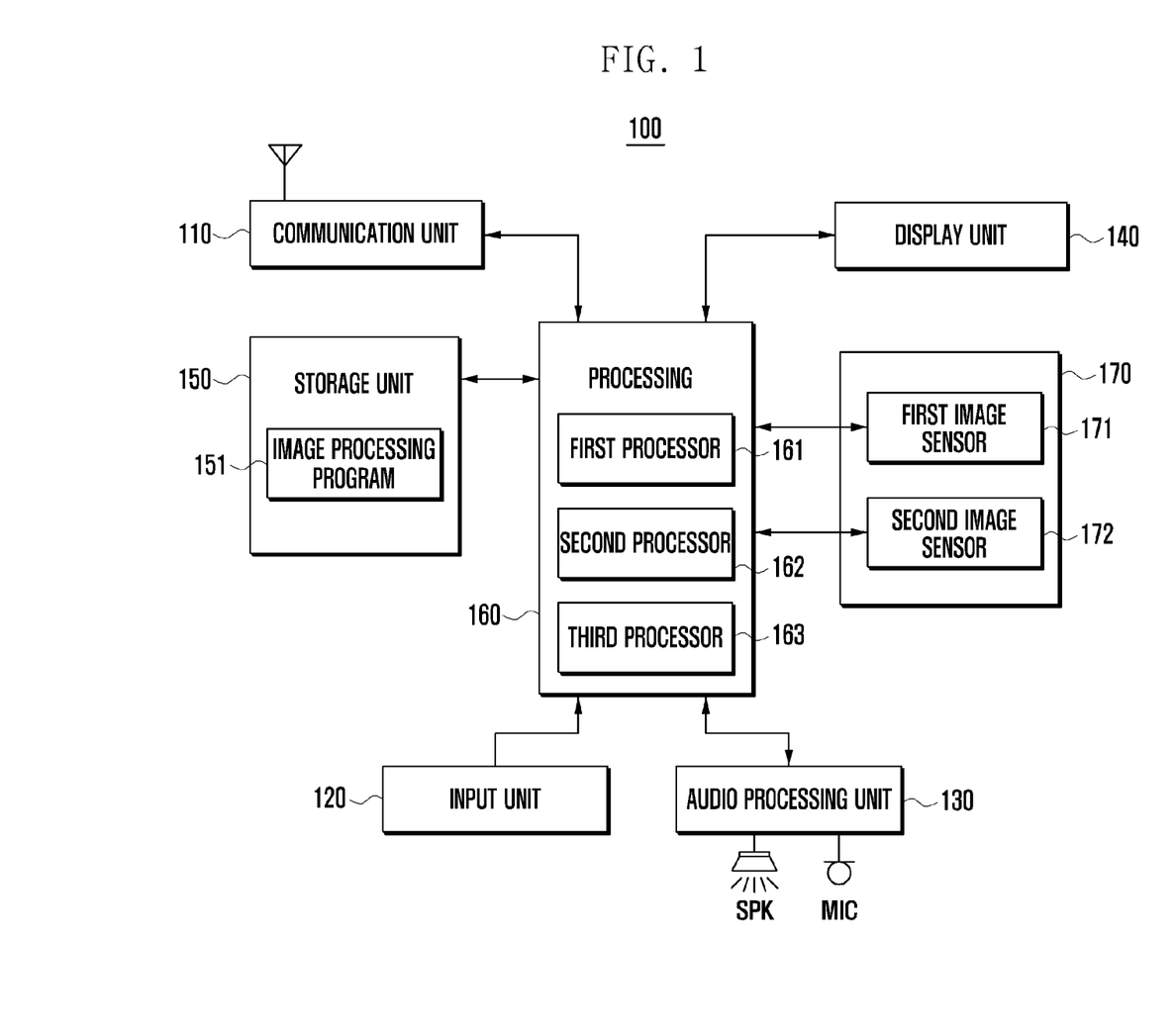
FIG. 1 shows an electronic device including an image sensor module according to invention principles.

FIG. 1 shows electronic device 100 including an image sensor module 170, a communication unit 110, an input unit 120, an audio processing unit 130, a display unit 140, a storage unit 150, and a control unit 160. The image sensor module 170 includes a plurality of image sensors 171 and 172. Although two image sensors 171 and 172 are depicted in FIG. 1, the image sensor module 170 may include more than two image sensors. In the case that the electronic device 100 supports the camera function but not any communication function, the communication unit 110 may be omitted. The control unit 160 includes an Application Processor (AP) for controlling the camera function and may include a plurality of processors such as a Central Processing Unit (CPU) and a Graphic Processing Unit (GPU) for processing graphic data. In FIG. 1, the first and second processors 161 and 162 may be CPUs for operating the electronic device 100 and are computing system control units responsible for data operation and comparison and interpreting and executing commands. The third processor 163 is a graphic processing unit for graphic data operation and comparison and interpreting and executing commands exclusive of the CPU. The CPU and GPU may be implemented as an integrated-multicore (e.g. quad-core) package. The CPU and GPU may be integrated into a System on Chip (SoC) and may be in a multi-layer package and may be termed an Application Processor (AP).

The electronic device 100 is provided with different hardware operation paths depending on whether a single mode or dual mode is employed for processing image data collected by at least one image sensors 171 and 172 of the image sensor module 170. The single mode comprises operation to acquire an image using one of the image sensors. The dual mode comprises operation mode to acquire an image using multiple image sensors. For example, the electronic device 100 is capable of performing direct image synthesis using one of the first and second processors 161 and 162 excluding the third processor as GPU in single mode operation with one of the image sensors 171 and 172. In dual mode operation, device 100 uses image sensors 171 and 172 for merging, outputting, and storing images using the third GPU processor 163. Device 100 may process image data using the first processor 161 in the single mode and may process image data using the third GPU processor 163 in the dual mode.

The electronic device 100 in the single mode, reduces electric current consumption by disabling the GPU which consumes relatively large amount of electric current and provides different user interfaces through improved image processing performance of the image sensor module 170 in the dual mode. The communication unit 110 may establish a communication channel with a base station or radio access point for supporting the communication function of the electronic device. The communication unit 110 may receive information from the outside or transmit information stored or collected by the electronic device 100 to the outside. The communication unit 110 may include a short range communication module for exchanging images with another electronic device through a short range communication channel and may establish a communication channel for transmitting still or motion image data taken by the image sensor module 170 to another electronic device. The communication unit 110 may receive motion image data from another electronic device and store the received still/motion image data in the storage unit 150 under the control of the control unit 160. The data stored in the storage unit 150 may include the images taken by a single image sensor in the single mode and/or the images taken by multiple image sensors in the dual mode.

The input unit 120 generates different input signals necessary for control of the operation of the electronic device. The input unit 120 may be implemented using at least one of a keyboard, keypad, and key buttons compatible with the electronic device 100. Where display unit 140 is implemented as a touchscreen, the input unit 120 may be provided in the form of a touch map presented on the touchscreen and may generate a shutter key input signal for controlling the operation of the image sensor and image sensor configuration signal. The key input signals may be generated by means of the hardware key arranged on a side of the electronic device 100 or a virtual touch keypad or virtual touch map presented on the touchscreen. The input unit 120 may generate an input signal for selecting a single mode or dual mode in response to the user input.

Audio processing unit 130 may include a speaker for outputting different audio data configured in association with the operation of the electronic device 100, decoded from the audio files stored in the storage unit 150, and received from the outside. The audio processing unit 130 may support an audio data collection function. For this purpose, the audio processing unit 130 may include a microphone (MIC). The audio data output by the audio processing unit 130 may include different alarm sounds and sound effects associated with the control of the image sensor modules 170. For example, the audio processing unit 130 may output an audio signal indicating single mode configuration or dual mode configuration. The audio data collected by the microphone (MIC) may be concurrently used along with a captured motion image. The microphone (MIC) may acquire a voice signal for telephony communication.

The display unit 140 provides different screens necessary for the operation of the electronic device. For example, the display unit 140 displays an idle screen and a menu screen and may provide a camera control screen, camera operation screen, and camera configuration screen. The display unit 140 may display a preview screen, image capture screen, and image shooting screen in the single mode. The display unit 140 may display the preview screen, image capture screen, and image shooting screen in the dual mode. The storage unit 150 may store Operating System (OS) and different applications, data, and algorithms associated with the operations of the electronic device. The storage unit 150 may store the image processing program for supporting the camera control function and store the still and motion image data captured by the image processing program 151.

The image processing program 151 may comprise different executable routines necessary for the camera functions of the electronic device 100. For example, the image processing program 151 may include a preview output routine for displaying the data collected and transferred by the image sensor module 170. The preview output routine may include a single mode preview support routing and a dual mode preview support routine. The image processing program 151 also may include a single mode capture support routine and a dual mode capture support routine. The image processing program 151 also may include a single mode motion image processing routine and a dual mode motion image processing routine. These routines control the operations of the hardware components of the control unit 160 to process the images.

The image sensor module 170 acquires still or motion images. Image sensors 171 and 172 may include a lens, a diaphragm, a diaphragm driver and a lens adjuster for taking a picture. The image sensors 171 and 172 include a plurality of photo sensors arranged in the form of a matrix to collect an optical image through the lens. The image sensors 171 and 172 transfer the optical image to a memory device of the camera. The camera memory device stores an optimal image formed by the photo sensors digitally and includes a plurality of address lines for reading the information stored at respective positions. The first image sensor 171 may be arranged at the front of the electronic device 100 for use in video communication and may be implemented to acquire an image with relatively low resolution as compared to the second image sensor 172. The second image sensor 172 may be arranged at the rear of the electronic device 100 to take an image and may be implemented to take the image with relatively high resolution compared with the first image sensor 171. The first and second image sensors 171 and 172 may be activated concurrently. The images taken by the first and second image sensors 171 and 172 may be output on the screen of the display unit 140 concurrently or independently.

Figure 2:
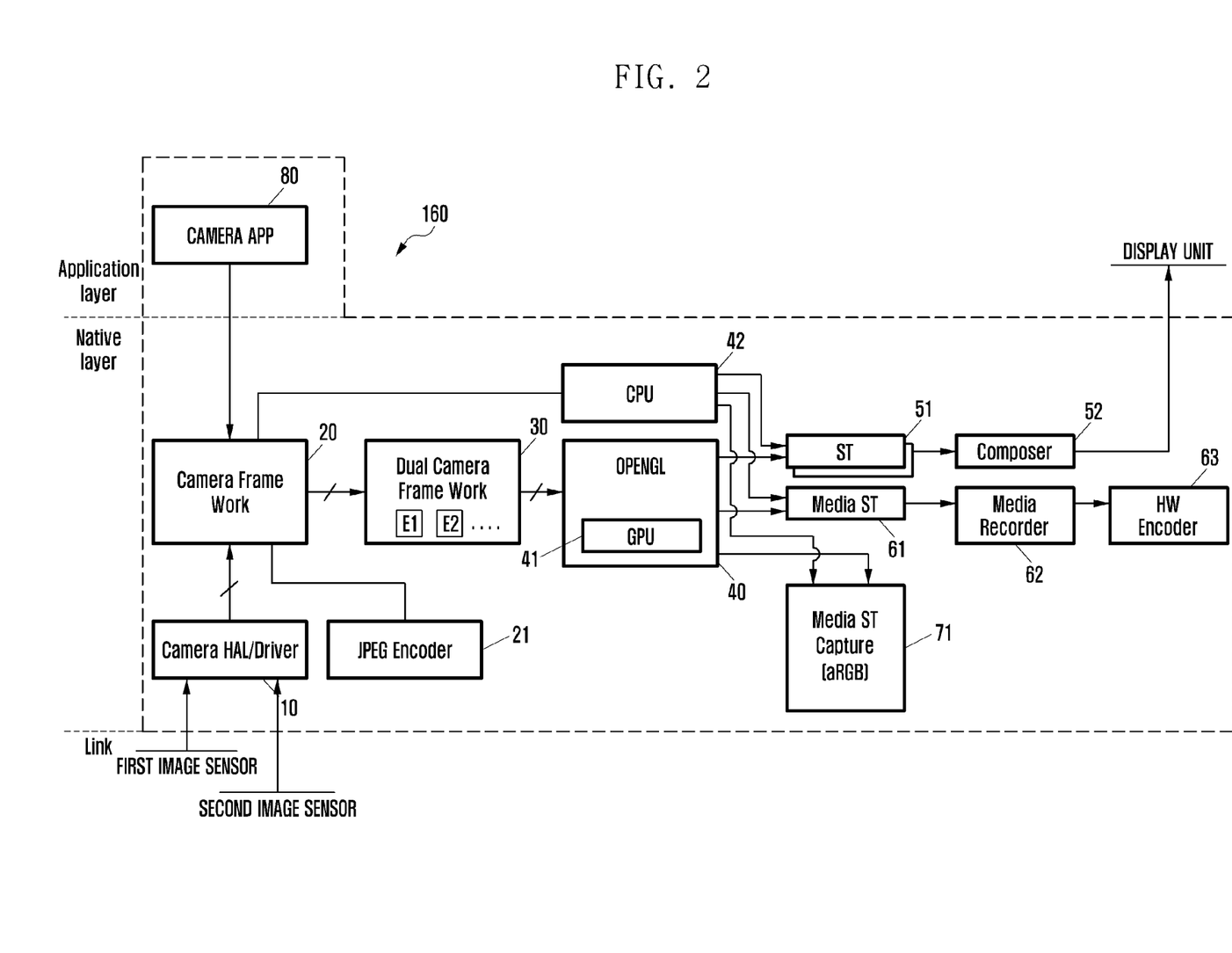
FIG. 2 shows a part of the control unit of FIG. 1 for controlling the operation of the image sensor according to invention principles.

FIG. 2 shows a portion of the control unit 160 of FIG. 1 for controlling the operation of the image sensor. Control unit 160 includes a camera application 80, a camera driver 10, a camera framework 20, a dual camera framework 30, an OpenGL 40 including GPU 41, a surface texture buffer 51, a hardware composer 52, a media surface texture buffer 61, a media recorder 62, a capture buffer 71, a JPEG encoder 21, and a hardware encoder 63. The control unit 160 includes the CPU 42 connected to the camera framework 20. The CPU 42 may include at least one of the first and second processors 161 and 162 as described with reference to FIG. 1. The CPU 42 may be provided with a surface texture buffer 51, a media surface texture buffer 61, and a capture buffer 71 in the single mode. The CPU 42 may transfer the data to the composer 52 and media recorder 62 without buffering in the buffers. That is, the CPU 42 may transfer the preview data to the composer 52 in a preview mode in the single mode. The CPU 42 may transfer the video data to the media recorder 62 directly in a video mode in the single mode.

If an input signal is generated for calling a camera function in response to the user request or according to the predetermined configuration, the camera application 80 is loaded into the control unit 160. Camera application 80 may be arranged within the application layer as illustrated and provides menus allowing for selecting one of the single and dual operation modes as well as configuring image sensors 171 and 172, controlling whether to store a captured image, and presenting a shutter input virtual key. If a menu selection signal is input by means of the input unit 120 or input function-enabled display unit 140, the camera application 80 may transfer the input signal to the native layer. For example, the camera application 80 may detect the input signal for calling a single mode or dual mode preview function, capture function, and motion image shooting function and transfer the signal to the camera framework 20.

In an embodiment, first image sensor 171 is the front camera and the second image sensor 172 is the rear camera. Camera application 80 may store and manage the status information concerning the front preview data and front video data input through the front camera 171 and the rear preview data, real video data, and rear capture data input through the rear camera 172. Particularly, the camera application 80 may store and manage the position and size information of the front and rear preview data on the screen of the display unit 140 and the position and size information of the front and rear video data on the screen of the display unit 140.

The front preview data is the preview data input through the front camera 171, and the rear preview data is the preview data input through the rear camera 172. The front video data is the motion image data collected by the front camera 171, and the rear video data is the motion image data collected by the rear camera 172. The rear camera captured data may be still image data. The frame data or video data may have relatively low resolution compared to the captured data. The front and rear video data may be configured to have different resolution in response to user command. The camera application 80 manages, plays and stores the data in response to the information concerning the data.

The camera driver 10 receives an image from the image sensor module 170 and transfers the image to the camera framework 20 under the control of the camera frame work 20. The camera driver 10 may discriminate between signals of the image sensors and send selected signals to the camera framework 20. The camera driver 10 may deliver the front preview and video data input from the front camera 171 and rear preview, video, and capture data input from the rear camera 172 to the camera framework 20. The camera framework 20 receives the front and rear image data from the camera driver 10 and sends the image data to the dual camera framework 30 selectively. Camera framework 20 may deliver the front preview and video data input from the front camera 171 and the rear preview, video, and capture data input from the rear camera 172 to the dual camera frame work 30. Camera frame work 20 may process the data provided by one of the front and rear cameras 172 directly without delivering it to the dual camera framework 30.

The dual camera framework 30 may transfer the data of the front and rear cameras 171 and 172 from the camera framework 20 to the GPU 41 of the OpenGL 40 and may transfer an effect image or effect image mask to the GPU 41 of the OpenGL 40. The dual camera framework 30 may prepare the images for the first and second image sensors 171 and 172 and apply the effect or mask images to the corresponding image data. For example, when merging the second image data obtained by the second image sensor 172 with the first image data obtained by the first image sensor 171, the dual camera framework 30 may apply the effect image to the synthesis area to generate a more natural image or to provide a predetermined pattern. The dual camera framework 30 may provide an effect image selection menu enabling selection of one of a plurality of effect images. For example, the dual camera framework 30 may request the display unit 140 to display at least one icon representing an effect image through the camera application 80. The icon may be a thumbnail image of the effect image or the icon may be provided in the form of a flower symbol icon, a shadow symbol icon, a blur symbol icon, and a color symbol icon facilitating user intuitive awareness of an effect to be applied. The OpenGL 40 may be a standard interface for controlling the GPU 41 or may be embodied within an interface comprising different APIs for controlling the GPU 41.

The OpenGL 40 may allocate a plurality of buffers for dual preview mode in applying dual images and may write the preview images of the front and rear cameras 171 and 172 into the respective buffers for output to the display unit 140. The OpenGL 40 may allocate a plurality of buffers that differ in size for dual capture mode in applying the dual images. OpenGL 40 may allocate a relatively large buffer for writing the capture data from the rear camera 172 and a relatively small buffer for writing the capture data from the front camera 171 and may write the front and rear capture data into a common buffer and output and store the data based thereon. The GPU 41 processes data in the dual mode under the control of the Open GL 40 and may merge the data from the front and rear carriers 171 and 172 and apply an effect image. The surface texture buffer 51 outputs a preview image and may allocate multiple surface texture buffers in the dual mode. Two surface texture buffers 51 may be allocated in the dual mode for the two image sensors 171 and 172.

The composer 52 may merge the preview data and a predefined User Interface (UI) layer of the display unit 140 into a preview image for presentation on the display unit 140. The composer 52 may also merge the preview image provided by the camera driver 10 with the UI and output the merged preview image to the display unit under the control of the camera framework 20 in the single mode. The composer 52 may merge the preview data written in the plural surface texture buffers 51 with the UI layer to generate the preview image to the display unit 140. The media surface texture buffer 61 outputs the preview image in the dual mode and buffers the video data provided by the image sensors 171 and 172 comprising data derived from respective front and rear cameras. The media surface texture buffer also may include a common buffer for writing both the front and rear video data and in the dual video data processing mode, the media surface texture buffer may be used as the common buffer for processing the preview data and video data. The OpenGL 40 may control common storage of the front and rear video data in the media surface texture buffer enabling composer 52 and the media recorder 62 to concurrently access the data written in the media surface texture buffer. Further, the preview data may be concurrently stored in the media surface texture buffer and used.

The media recorder 62 may transfer the video data provided by the camera driver 10 to the hardware encoder 63 directly under the control of the camera framework 20 in the single mode by transfer of the video data written in the media surface texture buffer to the hardware encoder 63. Also, the media recorder 62 may transfer the video data obtained by merging the front and rear video data written in the common buffer to the hardware encoder 63. The capture buffer 71 supports the capture function and where front camera 171 does not support image capture, the capture buffer is allocated for the rear camera 172. Since the rear camera 172 has relatively high pixel image data resolution, the capture buffer 71 is allocated to have a size large enough to buffer the corresponding capture data. The capture buffer 71 may buffer the capture data provided by the camera driver 10 directly without passing through the OpenGL 40 and GPU 41 in the single mode and may transfer buffered capture data to the JPEG encoder 21 under the control of the camera framework 20.

In the dual mode, the capture buffer 71 may buffer the capture data of the front and rear cameras 171 and 172 and may store the capture data in different formats in response to user input or predetermined configuration data. Buffer 71 buffers rear capture data where electronic device 100 supports just rear capture mode. Where device 100 supports both the front and rear capture modes concurrently, the capture buffer 71 may buffer the front or rear capture data or the merged front and rear capture data. In storing merged capture data, the full screen capture data stored in the capture buffer 71 may be adjusted in size to be fit rear capture data size. For example, rear preview data is displayed at the resolution of 2M pixels on the screen of the display unit 140 where the rear capture data stored has a resolution of 13M pixels while the front capture data has the resolution of 2M pixels. Since there is significant difference in pixel resolution between the requested capture image and the image to be stored, the electronic device 100 may perform pixel expansion on the full screen capture data to match the preview image. Device 100 may limit pixel expansion in full screen capture to avoid over-pixel expansion. The pixel expansion limit may be determined differently depending on the number of pixels of the preview image of the electronic device. The JPEG encoder 21 encodes the capture data written in the capture buffer 71 and may store the encoded capture data in the storage unit 150. The hardware encoder 63 encodes the video data provided by the media recorder 62 and may also store the encoded video data in the storage unit 150.

Figure 3:
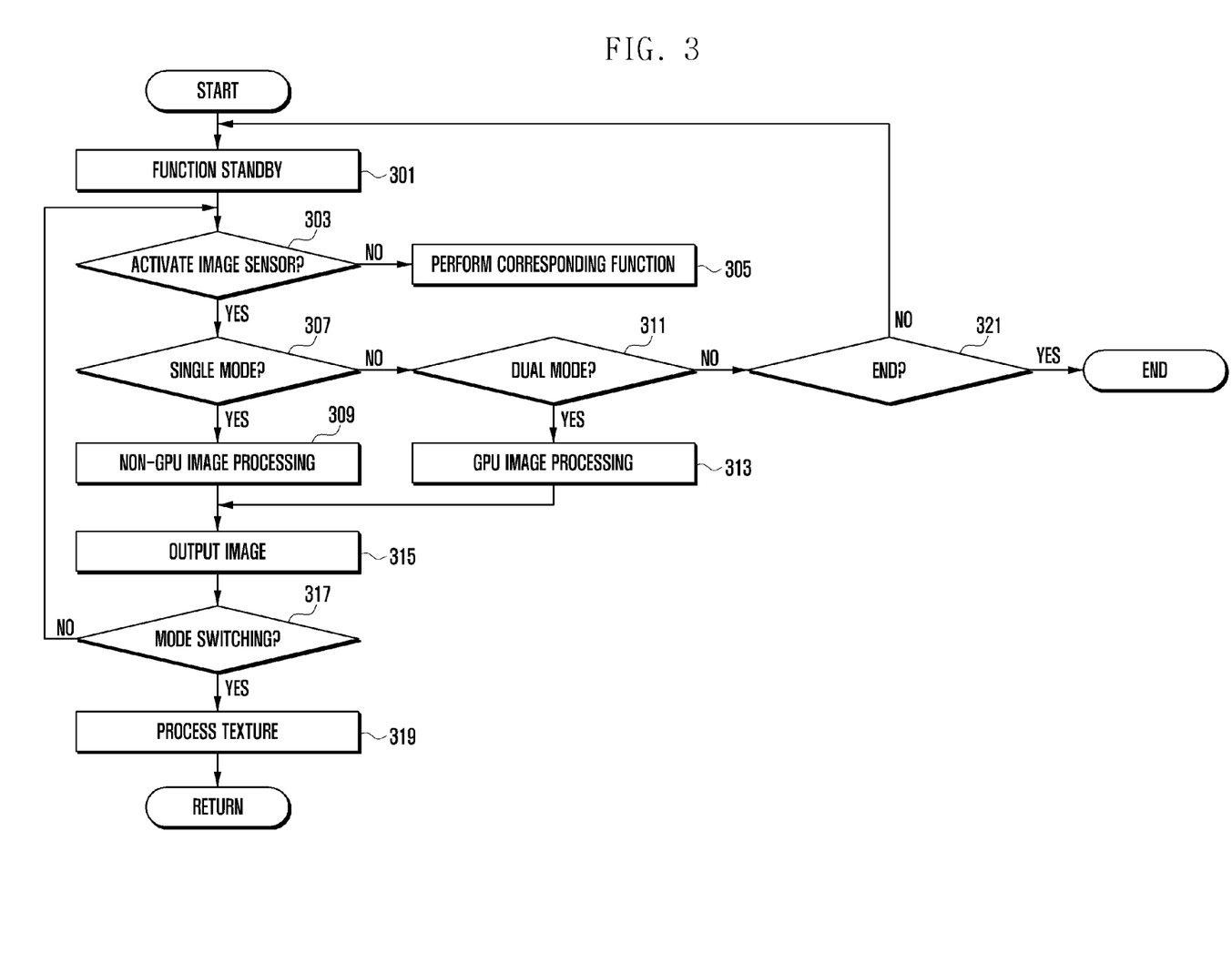
FIG. 3 shows a flowchart of an image data processing method according to invention principles.
Figure 4:
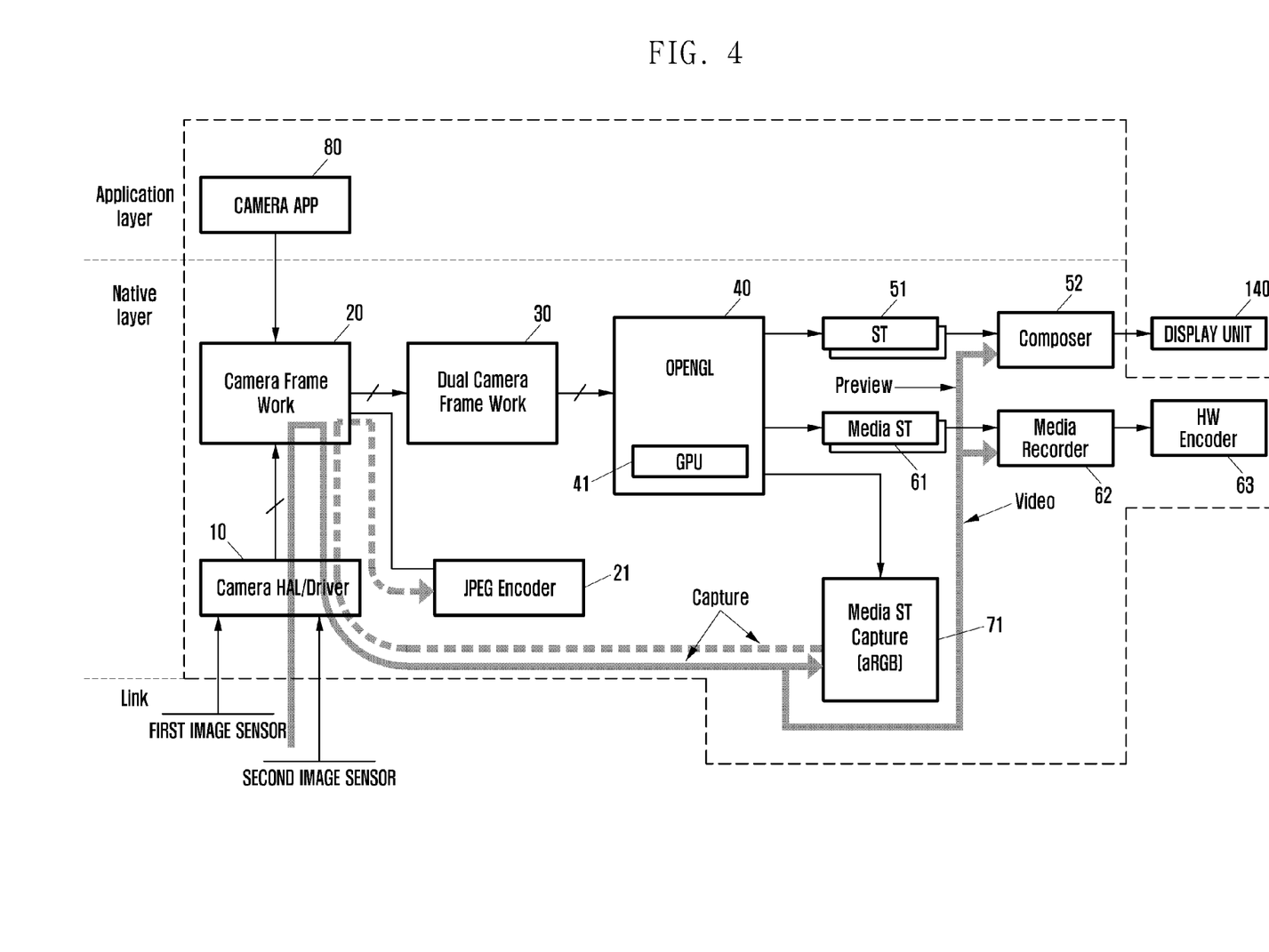
FIG. 4 shows a single mode data processing portion of the control unit of the electronic device according to invention principles.
Figure 5:
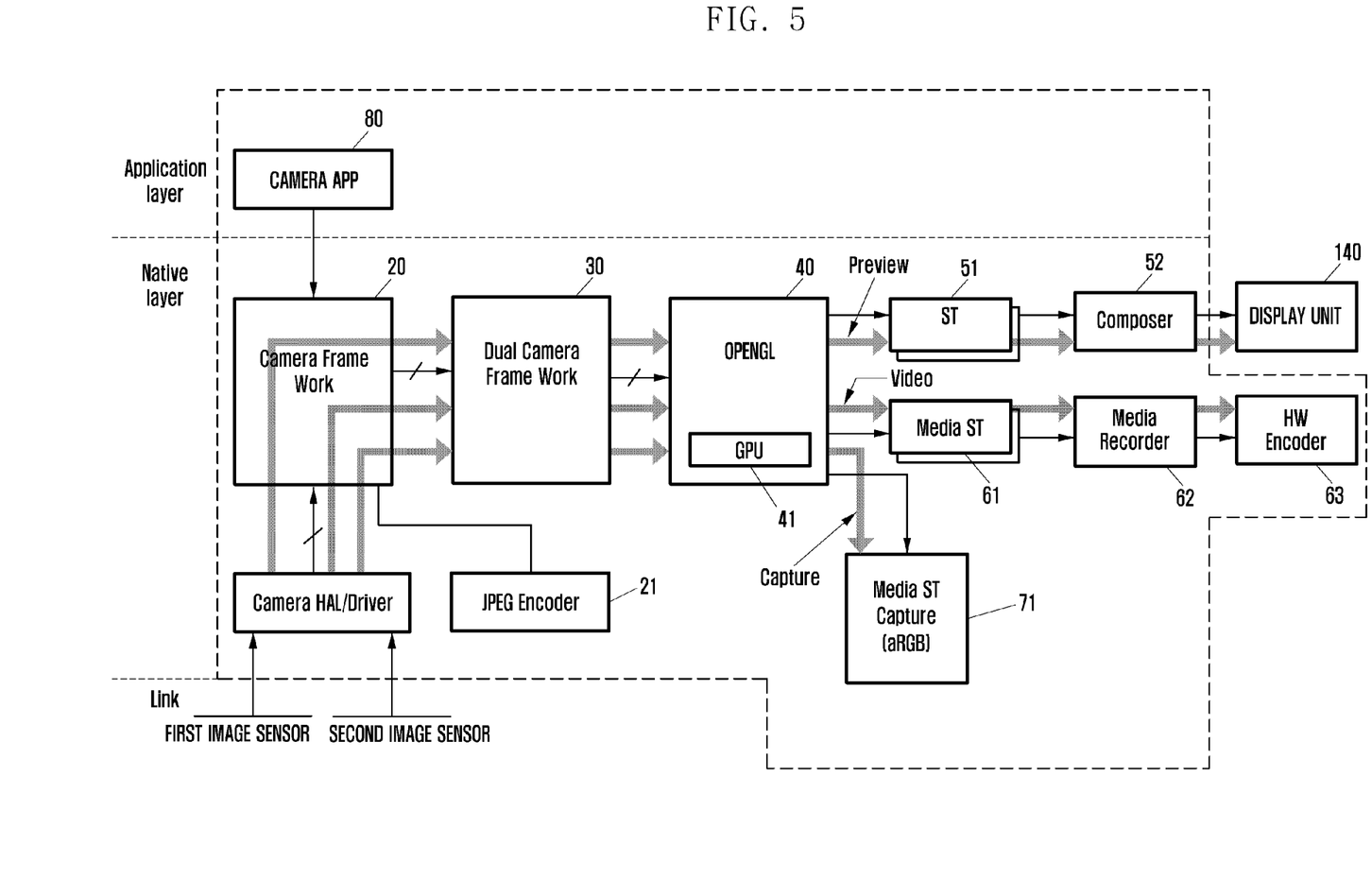
FIG. 5 shows a dual mode data processing portion of the control unit of the electronic device according to invention principles.

FIG. 3 shows a flowchart of an image data processing method. FIG. 4 shows a single mode data processing portion of the control unit of the electronic device. FIG. 5 shows a dual mode data processing portion of the control unit of the electronic device. Referring to FIG. 3, control unit 160 is in a function standby state at operation 301 where at least one of the different functions is executed before the activation of the camera function. For example, the function standby state may be a pre-power-on state or boot-up state subsequent to power-on. The function standby state may be a file playback state or a file search function standby state. The control unit 160 monitors and detects an event and, if an event is detected, determines whether the event is an image sensor module activation event at operation 303. If the event is not the image sensor module activation event, the control unit performs a function corresponding to the detected event at operation 305. For example, the control unit 160 may execute a communication function or an image gallery application according to the type of the event.

If the image sensor module activation event is detected at operation 303, the control unit 160 determines whether a single mode configuration signal is detected at operation 307. If the single mode configuration signal is detected, the control unit 160 performs non-GPU image processing at operation 309. The control unit 160 activates one of the first and second image sensors 171 and 172 according to the single mode configuration and executes a function for a corresponding activated image sensor. For example, the control unit 160 may control execution of video communication using the first image sensor 171 corresponding to the front camera. Control unit 160 initiates processing the image data obtained by the first image sensor to generate output data for display on unit 140 without GPU processing. The control unit 160 initiates processing of a subject image acquired using second image sensor 172 for use in the preview mode, capture mode, or video mode for output via display unit 140 and/or stored in the storage unit 150 without GPU processing.

If no single mode configuration signal is detected, the control unit 160 determines whether a dual mode configuration signal is detected at operation 311. If a dual mode configuration signal is detected, the control unit 160 performs GPU-based image processing at operation 313. For example, the control unit 160 may process the data provided by the first and second image sensors 171 and 172 to be output through the display unit 140 or stored as video data or merged. If the image sensor module is not in the dual mode, the control unit 160 determines whether a device turn-off signal is detected at operation 321. If there is no device turn-off signal, the control unit 160 returns the procedure to operation 301. Subsequent to operation 309 or 313, the control unit 160 may output the processed image at operation 315. The processed image may be output to at least one of the display unit 140 and the storage unit 150. Control unit 160 determines whether a mode switching signal is detected at operation 317. If no mode switching signal is detected, the control unit 160 returns the procedure to operation 303. Otherwise if the mode switching signal is detected, the control unit 160 processes a texture at operation 319. Control unit 160 controls buffering of the currently acquired data in the single mode or initiates output of the buffered data to the display unit 140. The control unit 160 may control application of a visual effect to the data output by the display unit 140 for the mode switching duration such as application of a gradual transparency effect, gradual opacity effect, dimming effect, and fadeout effect. The control unit 160 also may control buffering of the data acquired or collected in a mode-switching process for use in a fade-in effect. In this way, the electronic device 100 removes a blinking effect occurring in the mode-switching process.

FIG. 4 shows hardware operation in single mode image data processing. The data from the camera framework 20 may be transferred to the composer 52, media recorder 62, and capture buffer 71 through the CPU processor described above with reference to FIG. 2. In the following description, the description is directed to the single mode operation with the exception of the configuration of the CPU process. Control unit 160 activates the camera function in response to a user request and the camera application may operate in the application layer. The control unit 160 may control the camera function to operate in a selected operation mode, e.g. single mode or dual mode, in response to input via input unit 120 or predetermined configuration data. If the single mode is selected or if a single mode configuration signal is input, the control unit 160 may receive the image data from one of the image sensors of the image sensor module 170. The image data is input by the second image sensor 172 of the image sensor module 170, for example, but similar operation occurs when the image data is received from the first image sensor.

The camera driver 10 may receive Bayer type image data or YUV type image data converted from the Bayer type image data provided by the second image sensor 172. A Bayer filter mosaic is a color filter array (CFA) for arranging RGB color filters on a square grid of photosensors. It is a particular arrangement of color filters used in most single-chip digital image sensors in digital cameras, camcorders, and scanners to create a color image. The filter pattern is 50% green, 25% red and 25% blue. The camera driver 10 may send the received image data to the camera framework 20. In the single mode configuration, the camera framework 20 may be configured to receive the image data from the composer 52, the media recorder 62, or the capture buffer 71. The camera driver 10 may send the camera framework 20 an image data pointer instead of the actual image data so as to skip the memory copy process (zero copy). Meanwhile, the camera driver 10 may send the composer 52 the preview image selected from the images provided by the second image sensor 172 in the single mode. Where a video mode is requested for recording motion image data, the camera driver 10 sends the video data to the media recorder 62. If a request for storing the captured data is received, the camera driver 10 sends the video data to the capture buffer 71 and the image data written in the capture buffer 71 is transferred to the JPEG encoder 21.

The image data processing system may establish a single mode path without dual camera framework 30, graphic processing unit (GPU) 41, and corresponding buffers in the single mode to support the preview mode, video mode, and capture mode. The image data processing system advantageously minimizes the electric current consumption of the GPU 41 by disabling the operation of the GPU for processing image data in the single mode.

FIG. 5 is a diagram illustrating the hardware operation in the dual mode image data processing procedure. Referring to FIG. 5, the control unit 160 activates the camera function in response to a user command using a camera application that operates in the application layer regardless of the operation mode, i.e. single or dual mode. The control unit 160 may control the camera function to operate in a certain operation mode, e.g. single mode or dual mode, in response to an input command via input unit 120 or predetermined configuration data. The control unit 160 may receive the image data from the image sensors 171 and 172 of the image sensor module 170. Device 100 may support image synthesis and processing where the image sensor module 170 includes more than two image sensors. The camera driver of the control unit 160 may send the video data provided by the first and second image sensors 171 and 172 to the camera framework 20. The camera framework 20 may send the image data received for the dual mode operation to the dual camera framework 30. The dual camera framework 30 may allocate a buffer to buffer the received image data and for applying an image effect. The image effect application may be performed as default or in response to a user request and be provided in different forms such as of, cubic, heart, and postcard in size and position.

The dual camera framework 30 may send the video data to the OpenGL 40 in response to a function to be executed currently in the dual mode. The dual camera framework 30 may send the preview data of the first and second image sensors 171 and 172 to the OpenGL 40 in the dual preview mode. In order to process the preview data, the OpenGL 40 may initiate writing the preview data from the first and second image sensors 171 and 172 into the respective surface texture buffers 51. The preview data written in the surface texture buffer 51 may be merged with UI layer elements by the composer 52 for output via display unit 140. The dual camera framework 30 may send the video data provided by the first and second image sensors 171 and 172 to the OpenGL 40 in the dual video mode and the OpenGL 40 may merge the video data from the dual camera framework 30 and write the merged video data into the common buffer. The system advantageously prevents redundant processing of the preview data and video data by transferring the video data written in the common buffer to the composer 52 and the media recorder 62. Further, if the video data of the first image sensor 171 and the video data of the second image sensor 172 are different in resolution, the GPU 41 of the OpenGL 40 may perform synthesis to compensate for resolution difference. For example, the OpenGL may perform buffer allocation and image synthesis based on a resolution of the high resolution image, i.e. resolution of the second image sensor 172.

In an image data capture mode, the control unit 160 establishes a specific processing path according to predetermined configuration data or in response to a user request. For example, the electronic device 100 may support at least one of a dual capture mode, a first image sensor-based single capture mode, and a second image sensor-based single capture mode. In the case that the dual capture mode is supported, the control unit 160 merges the capture data from the first and second image sensors 171 and 172 into a merged capture data which is encoded and stored. The control unit 160 may generate the merged capture data by processing the low resolution captured data based on the aspect ratio of the display unit 140 in response to data indicating the resolution of the high resolution capture data. The control unit 160 may normalize the preview data size of data from the first image sensor 171 to the preview data size of the second image sensor 172 for the dual preview mode-based images displayed by the display unit 140. Alternatively, unit 160 may normalize image sensor data with a weighting value in the range from 0 to 1 relative to data from the other sensor in merging sensor data. Unit 160 may restrict the size adjustment to prevent the captured image of the first image sensor 171 from being natural where an unnaturalness level may be calculated in experimental and statistical manner. The calculated value may be adjusted for individual electronic devices in response to difference in resolution between the first and second image sensors 171 and 172. Device 100 establishes a dual mode processing path including the graphic processor to merge image data from a plurality of image data sensors.

Figure 6:
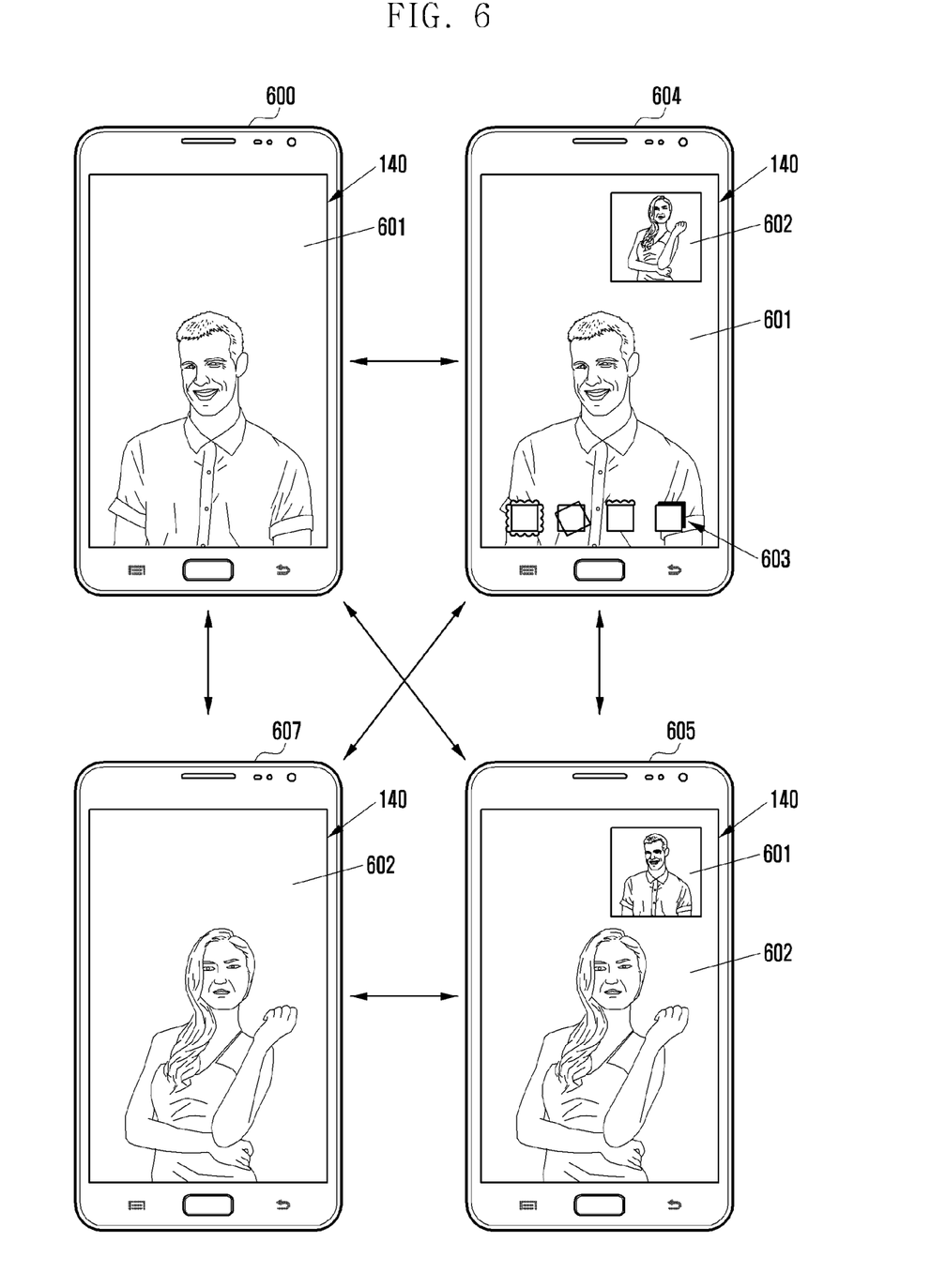
FIG. 6 shows displayed images illustrating a camera function-related screen interface provided by the electronic device according to invention principles.

FIG. 6 illustrates displayed images comprising a camera function-related screen interface provided by the electronic device 100. Device 100 may support at least one of the first image sensor-based single mode as shown in the exemplary screen display 600, a first and second image sensors-based dual mode as shown in the exemplary screen display 603, an effect image application and position change dual mode as shown in the exemplary screen display 604, and a second image sensor-based signal mode. The electronic device 100 may switch among the operation modes. Although the effect images 603 are presented in the exemplary screen display 604, the effect images 603 may be provided in other screen images. Although the images 601 and 602 provided by the image sensors are presented on a main screen and a pip (picture-in-picture) window respectively in the dual mode, the display unit 140 of the electronic device 100 may split the screen by drawing a horizontal or vertical center line to display the images 601 and 602 provided by the image sensors respectively, for example. The PIP window may be configured to have a predetermined area so as not to hide a face in the main image.

In the single mode, the electronic device 100 may overlay a preview image on the UI layer without use of the graphic processor (GPU) and activate the composer 52. The electronic device 100 may use an image texture for supporting the first and second image sensors 171 and 172 based on the graphic processor in the dual mode and may allocate a buffer to use the image texture. The electronic device may merge the image data provided by the first and second image sensors 171 and 172 through the operation of the GPU 41 and store at least one effect image 603 in the buffer in response to a user or system command. The texture written in the buffer may be transferred to the display unit buffer for use in preview and is provided to the JPEG encoder to support seamless capture function in a dual preview mode.

In an embodiment, when switching from the single mode to the dual mode, the electronic device may secure the texture for the image data of the first and second image sensors 171 and 172. The electronic device 100 may switch the background and PIP window seamlessly through texture transfer without generation of extra texture by switching to a predetermined texture in the dual preview mode or the dual video mode. The electronic device 100 may support seamless switching between different modes through GPU-based operation and recording while switching between the background and PIP window. The electronic device may generate the PIP texture corresponding to the image of the first image sensor in advance in an inactive state such as a second image sensor, single mode such that the PIP texture is applied to a single mode screen in response to voice recognition, UI touch, or physical key input, for example.

In an embodiment, the electronic device 100 may generate the masks corresponding to a plurality of effect images 603 as respective textures. This texture management method reduces delay in switching between the effect images 603. The PIP window may be on/off freely in the dual video mode. The electronic device 100 may determine the position of the PIP window to which the effect image 603 is applied in response to a predetermined rule. For example, if an input signal triggering applying the effect image 603 is detected in the dual mode, the PIP window to which the effect image 603 is applied is output at a position determined as default. If the position of the PIP window to which the effect image 603 is applied is changed, the PIP window may be displayed at the position designated as default. The electronic device 100 may apply the effect image 603 depending on the position of the PIP window. For this purpose, the camera application 80 may manage the position value of the PIP window and effect image application status. In response to a new effect image being requested, the new effect image 603 may be applied in the position of the previous PIP window. Device 100 generates textures corresponding to the image data provided by the image sensors and merges the images and applies effect images based on the texture. The electronic device 100 may change the size and position of the PIP window according to user request and may limit the range of the size of the effect image 603 so as not to go out the screen.

The electronic device 100 may further include different function modules. For example, the electronic device may further include a short range communication module, a data communication interface for wireless or wired communication of the electronic device, an Internet communication module for connection to the Internet Protocol (IP) network, and digital broadcast module for receiving and playing the digital broadcast signals. The electronic device 100 may include cellular communication terminals operating based on different communication protocols, a Portable Multimedia Player (PMP), digital broadcast player, Personal Digital Assistant (PDA), music player (e.g. MP3 player), portable game console, smartphone, laptop computer, hand-held computer, and equivalents performing communication and multimedia processing.

The image data processing system advantageously reduces image data processing load and electrical power consumption and provides a user friendly interface. Although preferred embodiments of the disclosure have been described using specific terms, those skilled in the art understand that different modifications and changes can be made without departing from the broader spirit and scope of the system. The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An electronic device for processing image data, the electronic device comprising:
    a plurality of image sensors; and
    a control unit configured to,
        in response to receiving image data from only one image sensor of the plurality of image sensors, disable a graphic processing unit and establish a single mode processing path to an output point, for processing the received image data using a first processor corresponding to a system processing unit via the single mode processing path;
        in response to receiving the image data from two or more sensors of the plurality of image sensors, establish a dual mode processing path to the output point, for processing the image data using a second processor corresponding to the graphic processing unit, and process the image data via the dual mode processing path, and
        in response to detection of a request for switching the mode, buffer texture data for use with the image data acquired using the plurality of image sensors, and output or store merged image data derived using the texture data.

2. The electronic device of claim 1, wherein the plurality of image sensors comprise:
    a first image sensor of a front camera of the electronic device; and
    a second image sensor of a rear camera of the electronic device.

3. The electronic device of claim 2, wherein the second image sensor acquires an image with a high resolution relative to an image acquired by the first image sensor.

4. The electronic device of claim 3, wherein the control unit compensates for low resolution of the acquired image by the first image sensor in response to data indicating screen resolution of a preview image.

5. The electronic device of claim 1, wherein the control unit comprises:
    a camera driver for receiving the image data provided by one sensor; and
    at least one of,
    a composer for merging the received image data provided by the camera driver with a predetermined screen data component,
    a media recorder for recording video based on the image data received by the camera driver, a capture buffer for buffering captured data derived based on the image data, and
    a Joint Photographic Expert Group (JPEG) encoder.

6. The electronic device of claim 1, wherein the control unit allocates a plurality of buffers for buffering the texture data for use with the received image data.

7. The electronic device of claim 1, further comprising a common buffer for buffering the merged image data obtained by merging wherein the common buffer stores preview data and video data.

8. The electronic device of claim 1, further comprising a buffer for buffering image effect data to be applied in merging with the image data.

9. An electronic device for processing image data, the electronic device comprising:
    a plurality of image sensors; and
    a control unit configured to,
        in response to receiving image data from one image sensor of the plurality of image sensors, establish a single mode processing path for processing the received image data using a first processor corresponding to a system processing unit via the single mode processing path; and
        in response to receiving the image data from two or more sensors of the plurality of image sensors, establish a dual mode processing path for processing the image data using a second processor corresponding to a graphic processing unit, and to process the image data via the dual mode processing path;
    wherein the control unit initiates,
    switching from a single mode using one image sensor to a dual mode for processing the image data from the plurality of image sensors,
    buffering texture data for use with the image data acquired using the plurality of image sensors, and
    outputting or storing merged image data derived using the texture data.

10. The electronic device of claim 9, wherein the control unit initiates switching between the dual mode and the single mode, to maintain the texture data and perform gradual presentation processing.

11. An image data processing method comprising:
    in response to receiving image data from only one image sensor of a plurality of image sensors, disabling a graphic processing unit and establishing a single mode processing path to an output point, for processing the received image data using a first processor corresponding to a system processing unit and processing the received image data using the first processor using the single mode processing path;
    in response to receiving the image data from two or more sensors of the plurality of image sensors, establishing a dual mode processing path to the output point, for processing the image data using a second processor corresponding to the graphic processing unit and processing the image data through the dual mode processing path,
    buffering texture data corresponding to the image data in response to detection of a request for switching from the single mode to the dual mode; and
    outputting or storing merged image data and the texture data.

12. The method of claim 11, wherein the plurality of image sensors comprises:
    a first image sensor of a front camera of an electronic device; and
    a second image sensor of a rear camera of the electronic device.

13. The method of claim 12, wherein the second image sensor acquires an image with a high resolution relative to an image acquired by the first image sensor.

14. The method of claim 13, including compensating for low resolution of the acquired image by the first image sensor in response to data indicating a screen resolution of a preview image.

15. The method of claim 11, further comprising:
   receiving the image data provided by one sensor; and
   performing at least one operation of,
      merging the image data provided by a camera driver with a predetermined screen component,
      recording video based on the image data provided by the camera driver, and
      buffering data derived based on the image data.

16. The method of claim 11, further comprising allocating a plurality of buffers for buffering the texture data for use with the received image data.

17. The method of claim 11, further comprising:
   buffering the merged image data using a common buffer; and
   using the merged image data buffered in the common buffer as preview data and video data.

18. The method of claim 11, further comprising buffering image effect data to be applied in merging with the image data.

19. The method of claim 11, further comprising maintaining the texture data and performing gradual presentation processing in response to switching between the dual mode and the single mode.

* * * * *